(No Model.)

A. J. BRACE & E. BROWN.
BICYCLE ATTACHMENT FOR USE ON ICE.

No. 557,956. Patented Apr. 7, 1896.

WITNESSES
Geo. M. Anderson
Phill. Masi.

INVENTORS
A. J. Brace
Edwin Brown
by E. W. Anderson
their Attorney

United States Patent Office.

AUGUSTUS J. BRACE, OF CATON, AND EDWIN BROWN, OF AUBURN, NEW YORK.

BICYCLE ATTACHMENT FOR USE ON ICE.

SPECIFICATION forming part of Letters Patent No. 557,956, dated April 7, 1896.

Application filed November 30, 1895. Serial No. 570,605. (No model.)

*To all whom it may concern:*

Be it known that we, AUGUSTUS J. BRACE, residing at Caton, in the county of Steuben, and EDWIN BROWN, residing at Auburn, in the county of Cayuga, State of New York, citizens of the United States, have invented certain new and useful Improvements in Attachments for Bicycles; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
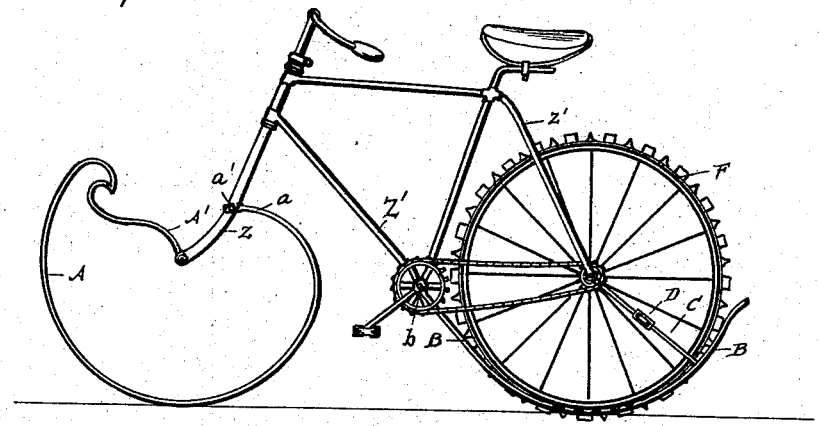
Figure 2:
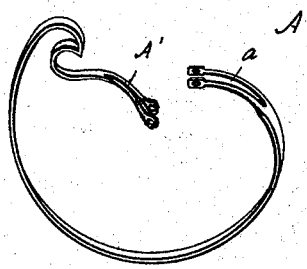
Figure 3:
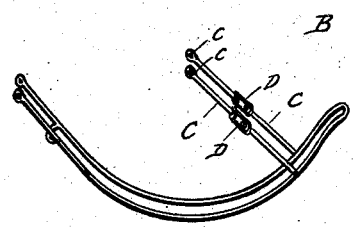
Figure 4:
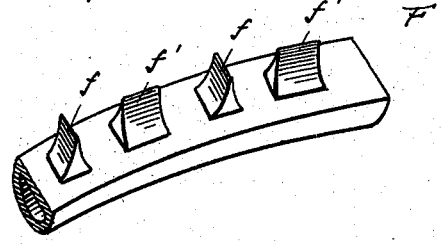

Figure 1 of the drawings is a side view of invention applied. Fig. 2 is a perspective view of front shoe. Fig. 3 is a perspective view of rear shoe. Fig. 4 is a perspective view of a portion of tire F.

The object of this invention is to provide means of simple and efficient character which can be readily applied to bicycles of the safety type to enable them to be used on ice or snow. With this object in view the invention consists in the novel construction and combination of parts, all as hereinafter described, and pointed out in the appended claims.

The invention more particularly consists in independent front and rear shoes of peculiar construction, the former being designed to take the place of the front wheel of the bicycle and the latter for attachment to the rear axle upon each side of the rear wheel; also, in a removable tire for the rear wheel, which is of such character as to prevent slipping of the wheel either laterally or in the direction of travel.

The front shoe A consists of a single runner, whose forward end portion is curved upwardly to a point slightly above the lower end of the front fork Z of the bicycle and is thence curved downward and to form the spring-arm A', which is forked at its rear end and is secured in the fork Z in place of the front wheel. The rear end portion of the runner is also curved upwardly, its forward end being forked at $a$ and secured between the arms of the fork Z, above the connection of the arm A', by means of a right-and-left screw or bolt $a'$.

The rear shoe B consists of two parallel runners, one upon each side of the rear wheel, and which are curved to conform approximately to the lower portion of the said wheel. The forward ends of said runners are pivotally clamped to the brace Z' of the frame, as indicated at $b$. Connected to the rear portions of the said runners are upwardly and forwardly extending rods C, whose upper end portions are formed with seats $c$ for engagement with the screw of the rear axle, one upon each side. Said rods are usually made in two sections connected by a turnbuckle D, by means of which the shoe can be adjusted to determine the degree of projection of the tire of the rear wheel below the runners. The under faces of the runners may be convex, concave, or flat, as may be desired.

F is the removable tire for the rear wheel. This tire is of metal and is of the proper shape in cross-section to enable it to fit neatly the rim of the said wheel when the pneumatic or other usual tire has been removed therefrom. This tire F may be secured to the rim in any suitable manner, ordinary tire-bolts through the tire and rim answering the purpose. The face of this tire is formed with two series of calks or projections $f\,f'$, which alternate with each other around the entire circumference of the tire. The calks $f$ are of wedge form, preferably concaved on their faces to give them greater thinness, and have comparatively sharp edges, which extend transversely of the tire. The calks $f'$ are of similar form; but they are placed at right angles to the calks $f$.

The calks $f$, it will be observed, are designed to prevent slippage of the wheel in the direction of its travel, while the calks $f'$ are designed to prevent lateral slippage.

Having thus described our invention, what we claim as new, and desire to secure by Letters Patent, is—

1. The herein-described attachment for bicycles for the purpose stated, said attachment consisting of a front shoe designed to take the place of the front wheel, and connected at its forward portion to the lower end of the front fork, and at its rear portion to the front fork, a rear shoe having parallel runners, placed one upon each side of the rear wheel, the forward portions of said runners being secured to the frame and their rear portions to the rear axle, and a tire designed to fit the rear wheel and having calks or projections thereon, substantially as specified.

2. In an attachment for bicycles for the purpose described, a front shoe consisting of a single runner whose forward portion is curved upwardly, and thence rearwardly to form a spring-arm A' designed for attachment to the front fork of the bicycle and whose rear portion is curved upward and forward and also designed for attachment to the said fork, substantially as specified.

3. In an attachment for bicycles for the purpose described, the combination with the front and rear shoes, of a tire adapted to fit the rim of the rear wheel, and having its face provided with two series of calks or projections arranged alternately of each other, those of one series being transversely of the tire, while those of the other series extend longitudinally thereof, substantially as specified.

4. In an attachment for bicycles for use on ice or snow, a wheel-tire formed of metal, and provided on its face with two series of calks or projections arranged alternately of each other, those of one series having their working edges disposed transversely of the tire, while those of the other series have their edges arranged longitudinally of the tire, substantially as specified.

In testimony whereof we affix our signatures in presence of witnesses.

AUGUSTUS J. BRACE.
EDWIN BROWN.

Witnesses as to signature of Brace:
ALONZO DEYO,
S. W. ADAMS.

Witnesses as to signature of Brown:
GERRITT S. BARNES,
WILLIAM S. BARNES.